Feb. 20, 1968
D. H. JACKSON ET AL  3,369,344
METHOD FOR THE RECOVERY OF DEODORIZER DISTILLATES
Filed May 3, 1966
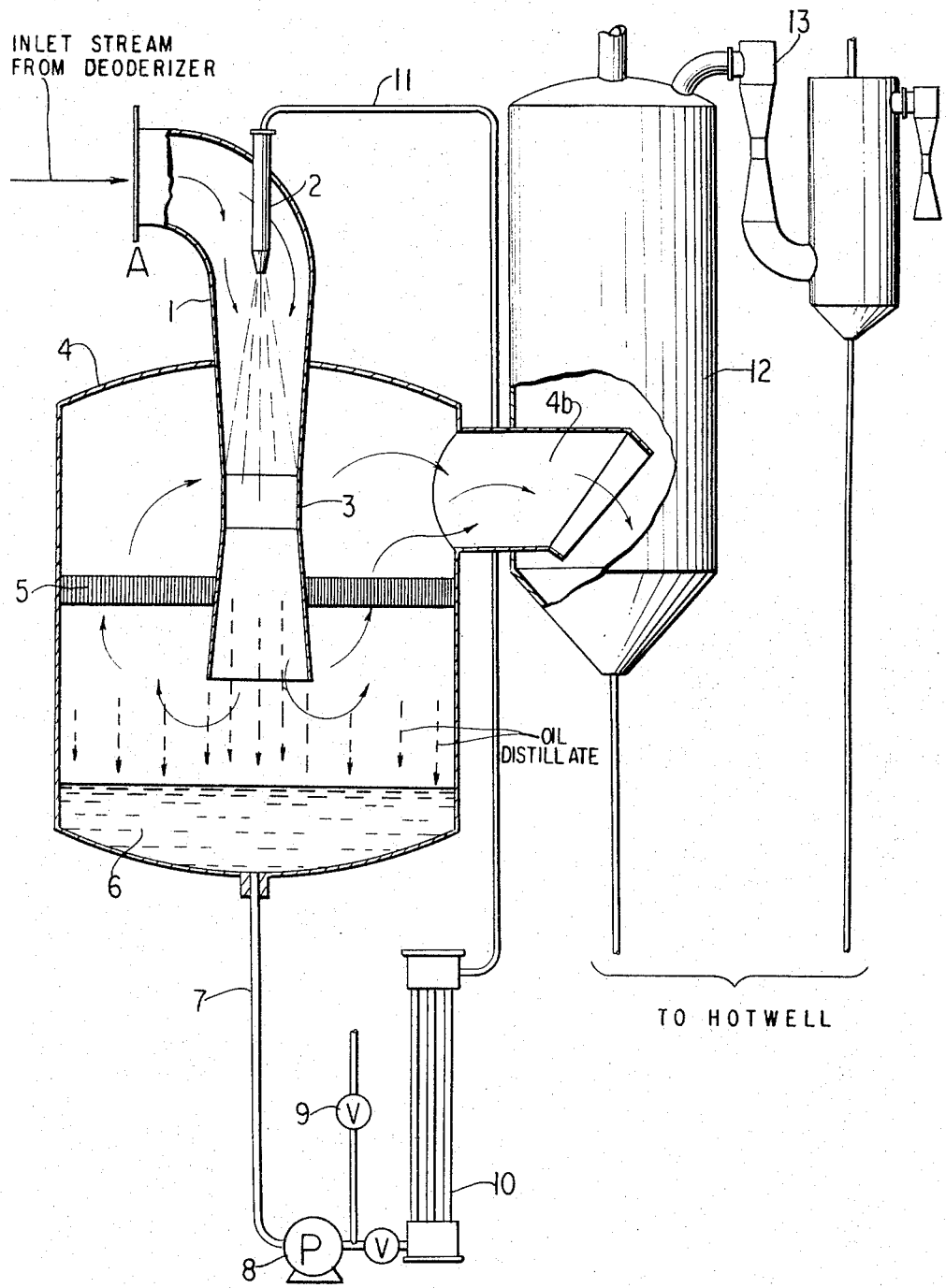
INVENTORS
DAVID H JACKSON
JAMES T. REYNOLDS
BY
ATTORNEYS United States Patent Office 3,369,344
Patented Feb. 20, 1968

3,369,344
METHOD FOR THE RECOVERY OF
DEODORIZER DISTILLATES
David H. Jackson, Short Hills, and James T. Reynolds, Scotch Plains, N.J., assignors to Croll-Reynolds Company, Inc., Westfield, N.J., a corporation of the United States of America
Filed May 3, 1966, Ser. No. 554,249
3 Claims. (Cl. 55—20)

ABSTRACT OF THE DISCLOSURE

This invention relates to a process for the condensation, separation and recovery of vegetable oil distillates which comprises the steps of flowing in parallel-currents a vaporous stream containing steam and a vegetable oil distillate and a stream of previously condensed vegetable oil distillate of approximately the same composition as said distillate contained in said vaporous stream, controlling the temperature of said stream of previously condensed vegetable oil distillate at a temperature at which substantially all said vaporous vegetable oil distillate is condensed but at which substantially none of said vaporous steam is condensed, contacting said concurrent vaporous stream and said temperature-controlled stream of previously condensed vegetable oil distillate in a constricted throat to effect condensation of said vegetable oil distillate in said vaporous stream, separating said condensed vegetable oil distillate from said steam in said vaporous stream beyond said constricted throat, collecting said separated condensed vegetable oil distillate and recycling a part of said condensed vegetable oil distillate as said stream of previously condensed vegetable oil distillate.

Undesirable and odoriferous materials in a vegetable oil are generally removed in a still by steam distillation under vacuum and the distillate is condensed in a counter current condenser in which the water contacting the distillate condenses the steam and distillate from the distilling vessel and discharges into a stream or sewer. In such a system the recoverable fatty acids and aromatics from the vegetable oil are wasted and in many instances the streams are polluted. A typical deodorizer system is comprised of a deodorizer vessel, one or more booster ejectors, a direct contact condenser, and a two-stage air ejector. The ejectors maintain a vacuum within the deodorizer vessel and condenser. Steam is put through the vessel to strip off the odoriferous materials, fatty acids, etc. and carry them out of the deodorizer vessel and into the condenser system. The steam carries off the low boiling fatty acids and odoriferous vapors and these vapors are then condensed by contact with water in a direct contact condenser and are then discharged from the system.

In once through cooling water systems, the condensed water and odoriferous oils are discharged directly to a sewer. This results in stream pollution and total loss of all of the distillates.

In a closed cooling water system, the condensed steam and distillates are recirculated through cooling towers and back to the condensers. As the distillates are immiscible with water, they form an emulsion which is difficult to separate. This emulsion tends to build up on the surfaces of the system as the condensed steam and distillate are recirculated. This build-up increases the maintenance cost because of plugging of lines and frequent equipment stoppage, which becomes necessary to clean the system.

A prior art method for the recovery of deodorizer distillates involving an oil to oil vapor scrubber has been proposed whereby the oil vapor to be condensed and oil in liquid form are contacted in counter current fashion. However, such a process requires a large separator section and relatively low velocities for both the oil vapor to be condensed and the condensing liquid oil. Furthermore, in such prior art process, if the velocity is too low, the scrubbing efficiency is poor, and, if the velocity is too high, entrained oil is carried in the vapor to pollute the condenser water. As practically all of the prior art units have one or two booster ejectors between the scrubber and the deodorizer, and high velocities are generally required to get proper and efficient performance of the boosters, it would be advantageous to operate at higher velocities. However, as previously noted, if in the counter current scrubber, the velocity is too high, entrained oil is carried in the vapor to pollute the condenser water.

It is an object of this invention to provide an improved process for recovering the distillates from a vegetable oil deodorizer whereby the major portion of the distillates are recovered in a recycling condenser oil of substantially the same composition as the distillates being removed from the vegetable or other oil.

Another object of this invention is to provide an improved process for recovering the distillates from a vegetable oil deodorizer whereby maintenance costs are substantially reduced.

A further object of this invention is to provide an improved process for recovering distillates from a vegetable oil deodorizer whereby stream pollution is substantially eliminated.

Another object of the invention is to provide an improved process of condensing vegetable oil distillates in a recycling condenser oil of substantially the same composition as the distillates circulating concurrent with the distillate vapors, whereby a larger through-put of distillate can be condensed in the same size condensing apparatus.

Another object of the invention is to provide an improved process of condensing vegetable oil distillate in a recycling condenser oil of substantially the same composition as the distillates whereby the distillates are not contaminated with water and whereby the water later used in the condensing process is not contaminated with the vegetable oil distillates.

Accordingly, the aforementioned and other objects and advantages are achieved by contacting the oil vapor and cooled liquid oil in concurrent streams within a constricted venturi throat. The flow of concurrent streams and the constricted throat enables a greater recovery of oil per hour with a smaller scrubber unit than that of the prior art counter-current flow type. Furthermore, the booster ejectors operate at maximum efficiency with the increased velocity provided by the constricted throat.

FIG. 1 is a diagrammatic illustration of a typical apparatus used in the practice of this invention.

It will be understood that other types of apparatus may be used to carry out the process.

The apparatus comprises a scrubber 1, separator tank 4, demistor layer 5, heat exchanger 10, oil spray nozzle 2, barometric condenser 12 and air evactor 13.

Steam, oil laden vapor and air from the deodorizer vessel enter the scrubber 1 at the inlet A. At approximately the inlet point A, the distillates from the deodorizer vessel contact a cool spray of oil of approximately the same composition as the oil distillates, which is sprayed into the venturi tube 3 in the separator tank 4, from the oil spray nozzle 2. This starts the condensation of the distillates, thereby reducing their volume and assisting in creating the vacuum under which the entire condensing system works. The inlet stream passes concurrently through the venturi section 3 of scrubber 1 until it reaches the outlet of the venturi 3 toward the bottom and well below the midpoint of separator tank 4. In the venturi section 3, the inlet stream comes in contact with the concurrent spray of previously condensed distillate oil from the nozzle 2, causing the oil in the inlet stream to condense. The condensed oil, steam and air then pass into the bottom of the separator tank 4, below the demistor layer wherein the distillate oil 6 settles to the bottom of the tank and the steam and air and other noncondensed gases pass through the demistor layer 5 and the steam and other gases pass through the outlet 4b of tank 4 and into contact with a spray of water in the barometric condenser 12. The demistor 5 comprises a series of baffles for removing any entrained particles of distillate oil trapped in the steam and air vapors. The demistor 5 may be made of either fiber, rock wool, metal or other like material. The condensed distillate flows into the pool 6 in the bottom of tank 4 and then passes through line 7 to the pump 8 where it is recirculated through a heat exchanger 10 and then back to the oil nozzle 2 through line 11. The oil level in the separator tank 4 is maintained by bleeding off excess distillate at valve 9 in the discharge line of pump 8. By virtue of the fact that the condensing distillate only comes into contact with recirculated condensed distillate of substantially the same composition, it is not contaminated with water or other contaminants and may be used or sold in the form in which it is removed through valve 9.

The entire system is maintained under vacuum by means of air evactor 13, which also acts to remove air and other non-condensed gases from the system. The quantity of distillate vapors that will condense depends upon a number of factors. Among these are the quantities of steam, air and oil in the inlet stream, the temperature of the inlet stream, pressure and type of oil in the inlet stream. It is preferable that the rate of condensation in the scrubber 1 be maintained so that only oil is condensed. If water vapor is condensed, problems will arise due to the formation of an oil-water emulsion clogging up the equipment. The apparatus can be operated so as to condense over 95% of the fatty acids distilled out of the vegetable oil, in the tank 4 so that the degree of contamination of the condenser water flowing out of condenser 12 is reduced to such a point that it creates no contamination problem.

The apparatus is constructed so that a concurrent flow of oil from the nozzle and inlet stream is effected. Furthermore, the flow of oil and inlet stream is channeled through a constricted throat. Both of these constructions are important and provide certain operating advantages. By reducing the area in which condensation takes place it is possible to substantially reduce both the size of equipment and also increase the rate of condensation as a more intimate contact between inlet vapor stream and oil is possible. Furthermore, the venturi section 3 of the scrubber 1, provides an area wherein the velocity of the merging fluids is substantially increased, which also effects an increase in the rate of condensation.

The venturi 3 discharges into the lower portion of tank 4 below the demistor baffles 5, so that the condensed fatty acids and other oils are substantially completely separated from the steam before it rises through the demistor 5 and flows into the barometric condenser 12.

As was pointed out above, the demistor 5 acts to reduce the amount of entrained oil in the water vapor and air. By virtue of the expansion of the stream coming out of the bottom of venturi 3 into the larger space in the bottom of tank 4, its velocity is somewhat reduced thereby facilitating separation of oil droplets from the steam in the bottom of tank 4 and in demistor 5.

The following specific example is given to further illustrate the invention and enable persons skilled in the art to better understand and practice the invention and is not intended to be limitative in any respect.

*Example I*

Apparatus as described in FIG. 1 was used. The apparatus was of the following size and type:

8 ft. diameter x 12 ft. long separator tank
24" x 24" venturi scrubber
48" diameter condenser
3 x 2—40 H.P. circulating pump
12" diameter—275 sq. ft. oil cooler exchanger
253—B12 C-R air removal pump An inlet stream from a 36" x 24" double stage ejector was flowed at a rate of 8100 lb./hr. and at a temperature of 300° F. The stream had the following composition:

|  | Weight percent | Flow rate (lbs./hr.) |
|---|---|---|
| Water vapor | 98.0 | 7,940 |
| Stearic acid (vapor) | 1.25 | 100 |
| Air | 0.75 | 60 |

A pressure of 50 mm. Hg was maintained by the air evactor. In order to effect start up, a previously collected volume of similar oil collected from skimmer operation was pumped into the separator tank. The distillate was recirculated at a ratio of 640:1 and at a rate of 6400 lb./hr. The circulated distillate was maintained at a temperature of 165° F. by means of a heat exchanger. Steam from the scrubber unit was condensed in the barometric condenser. Analysis of the steam condenser discharge water flow indicated a contamination of only 1.43 p.p.m. of oil. This contamination corresponded to a 99.0% recovery of distillate. Such a recovery is extremely high considering that the maximum percentage, calculated by Dalton's Law of partial pressures, is figured at 99.2%.

While certain specific examples and preferred modes of practice of the invention have been set forth it will be understood that this is solely for the purpose of illustration and that various changes and modifications may be made without departing from the spirit of the disclosure and the scope of the appended claims.

What is claimed is:

1. A process for the condensation, separation and recovery of vegetable oil distillates which comprises the steps of flowing in parallel-currents a vaporous stream containing steam and a vegetable oil distillate and a stream of previously condensed vegetable oil distillate of approximately the same composition as said distillate contained in said vaporous stream, controlling the temperature of said stream of previously condensed vegetable oil distillate at a temperature at which substantially all said vaporous vegetable oil distillate is condensed but at which substantially none of said vaporous steam is condensed, contacting said concurrent vaporous stream and said temperature-controlled stream of previously condensed vegetable oil distillate in a constricted throat to effect condensation of said vegetable oil distillate in said vaporous stream, separating said condensed vegetable oil distillate from said steam in said vaporous stream beyond said constricted throat, collecting said separated condensed vegetable oil distillate and recycling a part of said condensed vegetable oil distillate as said stream of previously condensed vegetable oil distillate.

2. A process according to claim 1, wherein said condensation is effected under vacuum.

3. Process of claim 1, wherein the uncondensed vapors are passed through a demistor and contacted with condensing water.

References Cited

UNITED STATES PATENTS

| | | | |
|---|---|---|---|
| 809,383 | 1/1906 | Lowe | 55—94 X |
| 1,182,543 | 5/1916 | Ferguson | 55—90 |
| 1,463,782 | 8/1923 | Armstrong | 55—89 X |
| 2,858,903 | 11/1958 | Goetz et al. | 55—89 X |
| 2,935,375 | 5/1960 | Boucher | 55—84 X |
| 3,142,548 | 7/1964 | Krantz | 55—89 |
| 3,170,007 | 2/1965 | Krantz | 55—94 X |
| 3,177,634 | 4/1965 | Latham et al. | 55—257 X |

REUBEN FRIEDMAN, *Primary Examiner.*

J. ADEE, *Assistant Examiner.*